(12) United States Patent
Wiberg et al.

(10) Patent No.: US 12,478,805 B2
(45) Date of Patent: Nov. 25, 2025

(54) RADIOTHERAPY DEVICE COMPRISING A TILTING MECHANISM

(71) Applicant: Elekta Limited, Crawley (GB)

(72) Inventors: Kristian Wiberg, Crawley (GB); Erik Carlander, Crawley (GB); Markus Nyman, Crawley (GB); Henrik Alexis, Crawley (GB)

(73) Assignee: Elekta Limited, Crawley (GB)

( * ) Notice: Subject to any disclaimer, the term of this patent is extended or adjusted under 35 U.S.C. 154(b) by 229 days.

(21) Appl. No.: 18/340,458

(22) Filed: Jun. 23, 2023

(65) Prior Publication Data

US 2023/0414971 A1 Dec. 28, 2023

(30) Foreign Application Priority Data

Jun. 28, 2022 (GB) ..................................... 2209482

(51) Int. Cl.
*A61N 5/10* (2006.01)
(52) U.S. Cl.
CPC ......... *A61N 5/1082* (2013.01); *A61N 5/1049* (2013.01); *A61N 2005/1055* (2013.01)
(58) Field of Classification Search
None
See application file for complete search history.

(56) References Cited

U.S. PATENT DOCUMENTS

| 2,793,296 A | * | 5/1957 | Peterson, Jr. | ............ A61N 5/01 378/65 |
| 2,890,349 A | * | 6/1959 | Huszar | ...................... A61N 5/01 378/68 |
| 2,950,394 A | * | 8/1960 | Stava | ........................ A61N 5/01 378/65 |
| 5,577,094 A | | 11/1996 | Fudamoto | |

(Continued)

FOREIGN PATENT DOCUMENTS

WO  WO-2009056151 A1   5/2009
WO  WO-2022136839 A1   6/2022

OTHER PUBLICATIONS

"United Kingdom Application Serial No. 2209482.5, Examination Report dated Nov. 21, 2022" (Nov. 21, 2022), 3 pgs.

(Continued)

*Primary Examiner* — Thomas R Artman
(74) *Attorney, Agent, or Firm* — Schwegman Lundberg & Woessner, P.A.

(57) ABSTRACT

A radiotherapy device can include a tilting apparatus for tilting a source of radiation, the tilting apparatus comprising: a plurality of guide rails comprising a first guide rail and a second guide rail and a plurality of carriages comprising a first carriage and a second carriage. The first carriage being translatable along the first guide rail and the second carriage being translatable along the second guide rail. The radiotherapy device can also include a support structure for supporting the source of radiation. The support structure being rotatably coupled to each of the first carriage and the (Continued)

second carriage. The first guide rail and the second guide rail can be angled with respect to one another such that translation of the first carriage and the second carriage along the first guide rail and the second guide rail causes tilting of the support structure.

16 Claims, 5 Drawing Sheets

(56) References Cited

U.S. PATENT DOCUMENTS

| | | | | |
|---|---|---|---|---|
| RE37,474 E * | 12/2001 | Hug | ................ | G01T 1/166 250/363.08 |
| 6,614,871 B1 * | 9/2003 | Kobiki | ................ | A61B 6/035 378/197 |
| RE38,560 E * | 8/2004 | Hug | ................ | G01T 1/166 250/363.08 |
| 6,865,254 B2 * | 3/2005 | Nafstadius | ................ | A61N 5/1081 378/65 |
| 6,969,194 B1 * | 11/2005 | Nafstadius | ................ | A61N 5/1082 378/65 |
| 7,132,674 B2 * | 11/2006 | Pastyr | ................ | A61N 5/1042 378/65 |
| 7,188,999 B2 * | 3/2007 | Mihara | ................ | A61N 5/1082 378/197 |
| 7,577,233 B1 * | 8/2009 | Tsang | ................ | G01N 23/223 378/207 |
| 8,536,547 B2 * | 9/2013 | Maurer, Jr. | ................ | A61B 6/4447 250/492.1 |
| 8,565,378 B2 * | 10/2013 | Echner | ................ | A61N 5/1042 378/65 |
| 8,629,415 B2 * | 1/2014 | Fadler | ................ | A61B 6/0407 600/3 |
| 8,693,621 B2 * | 4/2014 | Thran | ................ | A61B 6/4021 378/17 |
| 8,989,846 B2 * | 3/2015 | Kuduvalli | ................ | A61B 6/4476 600/407 |
| 9,155,912 B2 * | 10/2015 | Yu | ................ | A61N 5/1047 |
| 9,308,395 B2 * | 4/2016 | Adler, Jr. | ................ | A61N 5/1082 |
| 9,687,200 B2 * | 6/2017 | Maurer, Jr. | ................ | A61B 6/032 |
| 9,833,208 B2 * | 12/2017 | Amano | ................ | A61B 6/0487 |
| 10,188,878 B2 * | 1/2019 | Grady | ................ | A61N 5/1082 |
| 10,500,420 B2 * | 12/2019 | Grady | ................ | A61N 5/1081 |
| 10,610,175 B2 * | 4/2020 | Maurer, Jr. | ................ | A61B 6/4447 |
| 10,709,903 B2 * | 7/2020 | Maurer, Jr. | ................ | A61B 6/488 |
| 11,229,409 B2 * | 1/2022 | Deutschmann | ................ | A61B 6/462 |
| 2004/0005027 A1 * | 1/2004 | Nafstadius | ................ | A61N 5/1082 378/65 |
| 2004/0184579 A1 * | 9/2004 | Mihara | ................ | A61N 5/1049 378/65 |
| 2005/0141671 A1 * | 6/2005 | Pastyr | ................ | A61N 5/1042 378/148 |
| 2010/0270480 A1 * | 10/2010 | Echner | ................ | A61N 5/1042 250/492.1 |
| 2011/0058644 A1 * | 3/2011 | Thran | ................ | A61B 6/4447 250/370.08 |
| 2011/0211665 A1 * | 9/2011 | Maurer, Jr. | ................ | A61N 5/1039 378/19 |
| 2011/0301449 A1 * | 12/2011 | Maurer, Jr. | ................ | A61B 6/032 378/65 |
| 2012/0035470 A1 * | 2/2012 | Kuduvalli | ................ | A61B 6/032 600/427 |
| 2012/0189102 A1 | 7/2012 | Maurer, Jr. et al. | | |
| 2012/0324648 A1 * | 12/2012 | Amano | ................ | A61B 6/4482 5/601 |
| 2013/0090514 A1 * | 4/2013 | Fadler | ................ | A61B 6/0407 600/1 |
| 2013/0144104 A1 * | 6/2013 | Adler, Jr. | ................ | G21F 5/02 600/1 |
| 2015/0190658 A1 * | 7/2015 | Yu | ................ | A61N 5/1048 378/65 |
| 2015/0231413 A1 * | 8/2015 | Grady | ................ | A61N 5/1082 378/65 |
| 2016/0310763 A1 * | 10/2016 | Grady | ................ | A61B 6/06 |
| 2017/0273643 A1 * | 9/2017 | Maurer, Jr. | ................ | A61N 5/1081 |
| 2020/0121267 A1 | 4/2020 | Deutschmann | | |
| 2023/0414971 A1 * | 12/2023 | Wiberg | ................ | A61N 5/1081 |
| 2024/0050771 A1 * | 2/2024 | Wiberg | ................ | A61N 5/1081 |

OTHER PUBLICATIONS

"British Application No. 2209482.5, Examination Report dated Jul. 10, 2024", (Jul. 10, 2024), 3 pgs.

"EP 23182219 Extended European Search Report mailed Nov. 14, 2023", 7 pages.

* cited by examiner

RADIOTHERAPY DEVICE COMPRISING A TILTING MECHANISM

CLAIM FOR PRIORITY

This application claims the benefit of priority to British Application Serial No. 2209482.5, filed Jun. 28, 2022, which is hereby incorporated by reference in its entirety.

TECHNICAL FIELD

This disclosure relates to a radiotherapy device, and in particular to a radiotherapy device comprising a tilting apparatus for tilting a source of radiation.

BACKGROUND

Radiotherapy can be described as the use of ionising radiation, such as X-rays, to treat a human or animal body. Radiotherapy is commonly used to treat tumours within the body of a patient or subject. In such treatments, ionising radiation is used to irradiate, and thus destroy or damage, cells which form part of the tumour.

A radiotherapy device typically comprises a gantry which supports a beam generation system, or other source of radiation, which is rotatable around a patient. For example, for a linear accelerator (linac) device, the beam generation system may comprise a source of radio frequency energy, a source of electrons, an accelerating waveguide, a beam shaping apparatus, etc.

When delivering a beam of radiation to a tumour or other target region of a patient, it is desirable to deliver the radiation from multiple angles to minimise the effect of the radiation on healthy tissue. One way of achieving this is to rotate the radiation source about the patient, for example about a longitudinal axis of the patient, such that radiation can be delivered to the target region from many angles in a plane perpendicular to the patient's longitudinal axis. Treatments that employ rotation of the radiation source solely in this manner, i.e. in a single geometric plane with respect to the patient, are known as 'coplanar'. Additional beam angles may be achieved by tilting the radiation source outside of the plane perpendicular to the patient's longitudinal axis, such that radiation is delivered at an oblique angle relative to the patient's longitudinal axis. Thus, radiation can be delivered from more than one geometric plane with respect to the patient. This increases the number of angles at which radiation can be delivered to the patient, thereby minimising the effect on healthy tissue. Such approaches are sometimes referred to as "non-coplanar".

However, many challenges present themselves when designing and constructing a radiotherapy device capable of both coplanar and non-coplanar treatment. In each of the coplanar and non-coplanar angles, the therapeutic radiation beam should be directed toward a single isocentre to meet safety and regularly requirements. Prior designs for devices capable of delivering both coplanar and non-coplanar treatment are typically extremely large and heavy. Both the cost and complexity of these prior systems is high. Complex counterweight systems may be required. Some prior designs have made use of a large curved rail along which the radiation source may be moved outside the plane of the gantry in order to deliver radiation from non-coplanar angles, however a disadvantage of this approach is that such designs require a significant increase in the height of the device in comparison with traditional coplanar devices, and therefore such devices do not make optimal use of available space, and may be too large to fit into a hospital's radiotherapy bunker.

The present disclosure seeks to address these and other disadvantages.

SUMMARY

A radiotherapy device is provided comprising a tilting apparatus for tilting a source of radiation. The tilting apparatus comprises a plurality of guide rails comprising a first and second guide rail. The tilting apparatus further comprises a plurality of carriages comprising a first carriage and a second carriage, the first carriage being translatable along the first guide rail and the second carriage being translatable along the second guide rail. The apparatus further comprises a support structure for supporting the source of radiation, wherein the support structure is rotatably coupled to each of the first and second carriages.

In some embodiments the first and second guide rail are angled with respect to one another such that translation of the carriages along the guide rails causes tilting of the support structure.

In some embodiments the device further comprises a gantry configured to rotate the tilting apparatus about a gantry rotation axis.

In some embodiments the support structure is tiltable between a first and a second configuration, wherein, in the first configuration, the source of radiation is positioned to emit radiation along a first beam axis, and in the second configuration the source of radiation is positioned to emit radiation along a second beam axis.

In some embodiments the first and second beam axes meet at a common isocentre.

In some embodiments the first beam axis is orthogonal to the gantry rotation axis, and the second beam axis meets the gantry rotation axis at an acute angle.

In some embodiments the first guide rail slopes toward the gantry rotation axis in a first slope direction moving away from the first beam axis; and the second guide rail slopes toward the gantry rotation axis in a second slope direction moving away from the first beam axis.

In some embodiments the radiotherapy device further comprises the source of radiation coupled to the support structure.

In some embodiments the guide rails are linear.

In some embodiments the guide rails are fixedly coupled to the gantry to rotate therewith.

In some embodiments the radiotherapy device further comprises an actuator configured to translate the carriages along the guide rails.

In some embodiments the actuator is a linear actuator coupled to at least one of the first and second carriage.

In some embodiments the plurality of guide rails further comprises a third and a fourth guide rail, the plurality of carriages further comprises a third and a fourth carriage, the third carriage being translatable along the third guide rail and the fourth carriage being translatable along the fourth guide rail, wherein the support structure is further rotatably coupled to each of the third and fourth carriages, and wherein the first and third guide rail are substantially parallel with respect to one another, and the second and fourth guide rail are substantially parallel with respect to one another.

In some embodiments the first and second guide rail are positioned on a first side of the support structure, and the third and fourth guide rail are positioned on a second, opposite side of the support structure.

In some embodiments the first carriage is rotationally coupled to the support structure to define a first rotational axis and the second carriage is rotationally coupled to the support structure to define a second rotational axis, and translation of the carriages along the guide rails changes a relative distance, in a radial direction, between the first and second rotational axes, wherein the radial direction is perpendicular to the gantry rotational axis.

A tilting apparatus is provided for tilting a source of radiation in the radiotherapy device, the tilting apparatus comprising a plurality of guide rails comprising a first and a second guide rail; a plurality of carriages comprising a first carriage and a second carriage, the first carriage being translatable along the first guide rail and the second carriage being translatable along the second guide rail; and a support structure for supporting the source of radiation, wherein the support structure is rotatably coupled to each of the first and second carriages; wherein the first and second guide rail are angled with respect to one another such that translation of the carriages along the guide rails causes tilting of the support structure.

A method of tilting a source of radiation of a radiotherapy device is provided, the device comprising the source of radiation and drive means comprising one or more linear actuators configured to translate the carriages along the guide rails to cause tilting of the support structure. The method comprises: while the device is in a coplanar configuration, driving the one or more linear actuators to translate the carriages along the guide rails in a first direction to tilt the source of radiation into a non-coplanar configuration; and while the device is in the non-coplanar configuration, driving the one or more linear actuators to translate the carriages along the guide rails in a second, opposite direction to thereby bring the radiation source back to the coplanar configuration.

FIGURES

Specific embodiments are now described, by way of example only, with reference to the drawings, in which:

FIG. 4c depicts a plan view of the apparatus depicted in FIG. 4a.

DETAILED DESCRIPTION

Figure 1:
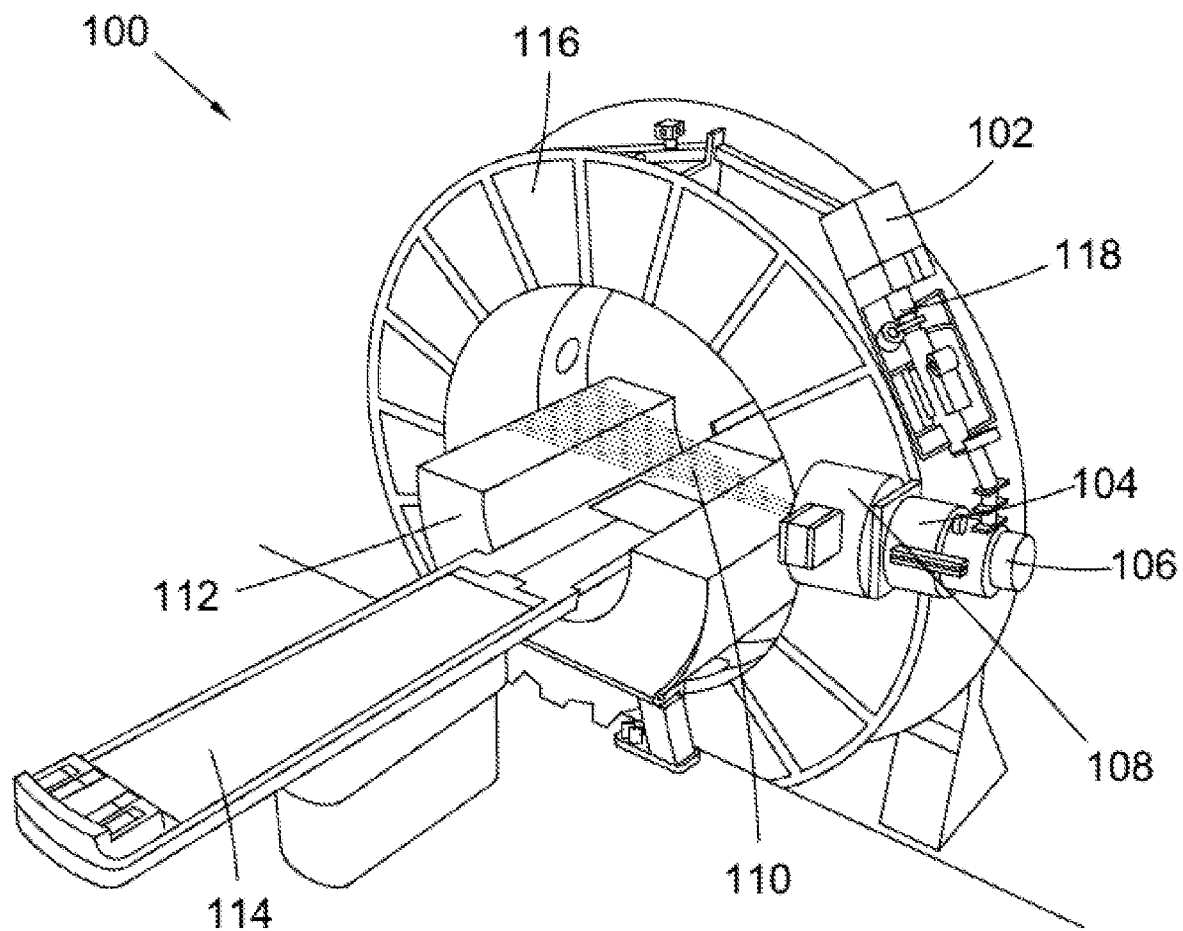
FIG. 1 depicts a radiotherapy device or apparatus according to the present disclosure.

In overview, the application discloses a tilting mechanism for a radiotherapy device. The tilting apparatus comprises a plurality of guide rails, each with a translatable carriage positioned thereon. The carriages are coupled to a tiltable support structure, which may in turn be coupled to a source of radiation. The guide rails are positioned and angled such that, by translation of the carriages along the guide rails, the support surface, and with it the source of radiation, can be tilted. A radiotherapy device fitted with such a tilting mechanism can provide a beam of radiation from multiple angles, and in particular may provide both coplanar and non-coplanar treatment, FIG. 1 depicts a radiotherapy device suitable for delivering, and configured to deliver, a beam of radiation to a patient during radiotherapy treatment. The device 100 is not depicted with a tilting apparatus, but it and its constituent components will be described generally for the purpose of providing useful accompanying information to assist in understanding the present disclosure. The device depicted in FIG. 1 is suitable to be fitted with a tilting mechanism in accordance with the present disclosure. While the device in FIG. 1 is an MR-linac, the implementations of the present disclosure may be used with any suitable radiotherapy device, for example a linac device.

The device 100 depicted in FIG. 1 is an MR-linac. The device 100 comprises both MR imaging apparatus 112 and radiotherapy (RT) apparatus which may comprise a linac device. The MR imaging apparatus 112 is shown in cross-section in the diagram. In operation, the MR scanner produces MR images of the patient, and the linac device produces and shapes a beam of radiation and directs it toward a target region within a patient's body in accordance with a radiotherapy treatment plan. The depicted device does not have the usual 'housing' which would cover the MR imaging apparatus 112 and RT apparatus in a commercial setting such as a hospital.

The MR-linac device depicted in FIG. 1 comprises a source of radiofrequency waves 102, a waveguide 104, a source of electrons 102, a source of radiation 106; a collimator 108 such as a multi-leaf collimator configured to collimate and shape the beam, MR imaging apparatus 112; and a patient support surface 114. In use, the device would also comprise a housing (not shown) which, together with the ring-shaped gantry, defines a bore. The moveable support surface 114 can be used to move a patient, or other subject, into the bore when an MR scan and/or when radiotherapy is to commence. The MR imaging apparatus 112, RT apparatus, and a subject support surface actuator are communicatively coupled to a controller or processor. The controller is also communicatively coupled to a memory device comprising computer-executable instructions which may be executed by the controller.

The RT apparatus comprises a source of radiation and a radiation detector (not shown). Typically, the radiation detector is positioned diametrically opposed to the radiation source. The radiation detector is suitable for, and configured to, produce radiation intensity data. In particular, the radiation detector is positioned and configured to detect the intensity of radiation which has passed through the subject. The radiation detector may also be described as radiation detecting means, and may form part of a portal imaging system.

The radiation source may comprise a beam generation system. For a linac, the beam generation system may comprise a source of RF energy 102, an electron gun 106, and a waveguide 104. The radiation source is attached to the rotatable gantry 116 so as to rotate with the gantry 116. In this way, the radiation source is rotatable around the patient so that the treatment beam 110 can be applied from different angles around the gantry 116. In a preferred implementation, the gantry is continuously rotatable. In other words, the gantry can be rotated by 360 degrees around the patient, and in fact can continue to be rotated past 360 degrees. The gantry may be ring-shaped. In other words, the gantry may be a ring-gantry.

The source 102 of radiofrequency waves, such as a magnetron, is configured to produce radiofrequency waves. The source 102 of radiofrequency waves is coupled to the waveguide 104 via circulator 118, and is configured to pulse radiofrequency waves into the waveguide 104. Radiofrequency waves may pass from the source 102 of radiofrequency waves through an RF input window and into an RF input connecting pipe or tube. A source of electrons 106, such as an electron gun, is also coupled to the waveguide 104 and is configured to inject electrons into the waveguide 104. In the electron gun 106, electrons are thermionically emitted from a cathode filament as the filament is heated. The temperature of the filament controls the number of electrons injected. The injection of electrons into the waveguide 104 is synchronised with the pumping of the radiofrequency waves into the waveguide 104. The design and operation of the radiofrequency wave source 102, electron source and the waveguide 104 is such that the radiofrequency waves accelerate the electrons to very high energies as the electrons propagate through the waveguide 104.

The design of the waveguide 104 depends on whether the linac accelerates the electrons using a standing wave or travelling wave, though the waveguide typically comprises a series of cells or cavities, each cavity connected by a hole or 'iris' through which the electron beam may pass. The cavities are coupled in order that a suitable electric field pattern is produced which accelerates electrons propagating through the waveguide 104. As the electrons are accelerated in the waveguide 104, the electron beam path is controlled by a suitable arrangement of steering magnets, or steering coils, which surround the waveguide 104. The arrangement of steering magnets may comprise, for example, two sets of quadrupole magnets.

Once the electrons have been accelerated, they may pass into a flight tube. The flight tube may be connected to the waveguide by a connecting tube. This connecting tube or connecting structure may be called a drift tube. The electrons travel toward a heavy metal target which may comprise, for example, tungsten. Whilst the electrons travel through the flight tube, an arrangement of focusing magnets act to direct and focus the beam on the target.

To ensure that propagation of the electrons is not impeded as the electron beam travels toward the target, the waveguide 104 is evacuated using a vacuum system comprising a vacuum pump or an arrangement of vacuum pumps. The pump system is capable of producing ultra-high vacuum (UHV) conditions in the waveguide 104 and in the flight tube. The vacuum system also ensures UHV conditions in the electron gun. Electrons can be accelerated to speeds approaching the speed of light in the evacuated waveguide 104.

The source of radiation is configured to direct a beam 110 of therapeutic radiation toward a patient positioned on the patient support surface 114. The source of radiation may comprise a heavy metal target toward which the high energy electrons exiting the waveguide are directed. When the electrons strike the target, X-rays are produced in a variety of directions. A primary collimator may block X-rays travelling in certain directions and pass only forward travelling X-rays to produce a treatment beam 110. The X-rays may be filtered and may pass through one or more ion chambers for dose measuring. The beam can be shaped in various ways by beam-shaping apparatus, for example by using a multi-leaf collimator 108, before it passes into the patient as part of radiotherapy treatment.

In some implementations; the source of radiation is configured to emit either an X-ray beam or an electron particle beam. Such implementations allow the device to provide electron beam therapy, i.e. a type of external beam therapy where electrons, rather than X-rays, are directed toward the target region. It is possible to 'swap' between a first mode in which X-rays are emitted and a second mode in which electrons are emitted by adjusting the components of the linac. In essence, it is possible to swap between the first and second mode by moving the heavy metal target in or out of the electron beam path and replacing it with a so-called 'electron window'. The electron window is substantially transparent to electrons and allows electrons to exit the flight tube.

The subject or patient support surface 114 is configured to move between a first position substantially outside the bore, and a second position substantially inside the bore. In the first position, a patient or subject can mount the patient support surface. The support surface 114; and patient, can then be moved inside the bore, to the second position, in order for the patient to be imaged by the MR imaging apparatus 112 and/or imaged or treated using the RT apparatus. The movement of the patient support surface is effected and controlled by a subject support surface actuator, which may be described as an actuation mechanism. The actuation mechanism is configured to move the subject support surface in a direction parallel to, and defined by, the central axis of the bore. The terms subject and patient are used interchangeably herein such that the subject support surface can also be described as a patient support surface. The subject support surface may also be referred to as a moveable or adjustable couch or table.

The radiotherapy apparatus/device depicted in FIG. 1 also comprises MR imaging apparatus 112. The MR imaging apparatus 112 is configured to obtain images of a subject positioned, i.e. located, on the subject support surface 114. The MR imaging apparatus 112 may also be referred to as the MR imager. The MR imaging apparatus 112 may be an MR imaging apparatus operating in a manner to obtain MR data, for example MR images. The skilled person will appreciate that such a MR imaging apparatus 112 may comprise a primary magnet, one or more gradient coils, one or more receive coils, and an RF pulse applicator. The operation of the MR imaging apparatus is controlled by the controller.

The controller is a computer; processor; or other processing apparatus. The controller may be formed by several discrete processors; for example; the controller may comprise an MR imaging apparatus processor, which controls the MR imaging apparatus 112; an RT apparatus processor, which controls the operation of the RT apparatus; and a subject support surface processor which controls the operation and actuation of the subject support surface 114. The controller is communicatively coupled to a memory, e.g. a computer readable medium.

The linac device also comprises several other components and systems as will be understood by the skilled person. For example, in order to ensure the linac does not leak radiation, appropriate shielding is also provided.

Figure 2:
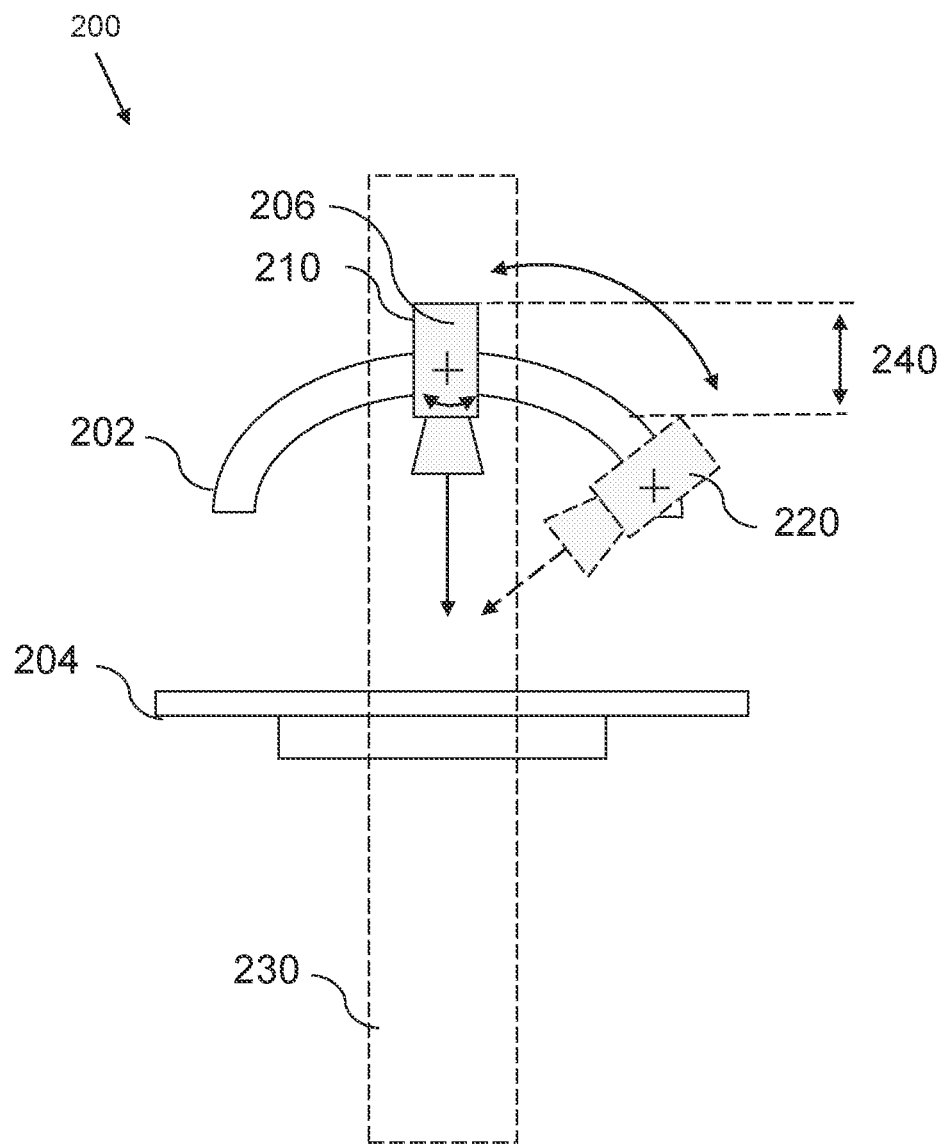
FIG. 2 depicts a radiotherapy device or apparatus comprising a tiltable radiation source according to the prior art.

FIG. 2 depicts a design for a radiotherapy device 200 comprising a tilting mechanism according to a prior design. The device 200 comprises a source of radiation 206 able to move along a curved rail 202. The device further comprises a gantry 230 configured to rotate both the curved rail 202 and the source of radiation 206 about a patient support surface 204. The source of radiation is moveable between a coplanar position 210 and a non-coplanar, tilted position 220. This is accomplished by translating the source of radiation 206 along the curved rail 202.

As can be appreciated from FIG. 2, there is a large radial displacement 240 between the source of radiation while in the coplanar position 210, and the source of radiation while in the tilted position 220. Accordingly, the prior design does not make optimal use of space in the radial direction, and this is compounded when considering that the source of radiation and curved rail must be rotated 360° about the patient support surface 204.

In addition to the large radial displacement 240, there is also a large horizontal displacement between the source of radiation while in the coplanar 210 and the tilted 220 position (the horizontal displacement is not marked in FIG. 2). Not only does the design not make use of optimal space in the horizontal direction, but because the source of radiation is extremely heavy the design necessitates complex counter-balancing measures to offset the large change in center of gravity as the source of radiation moves between the coplanar and tilted positions.

Figure 3A:
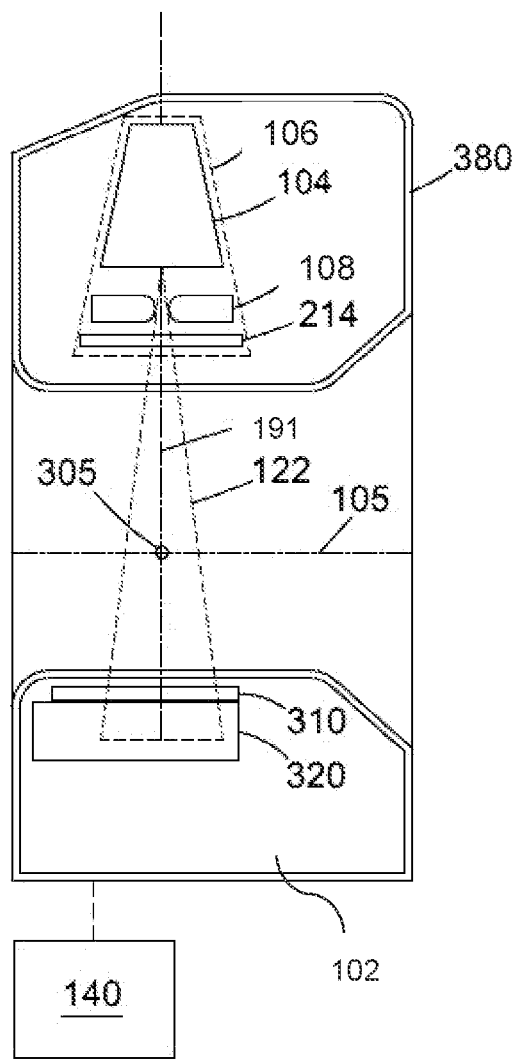
FIGS. 3a and 3b depict a cross-section through a radiotherapy device according to the present disclosure, with FIG. 3a depicting the device in a coplanar configuration and FIG. 3b depicting the device in a non-coplanar configuration.
Figure 3B:
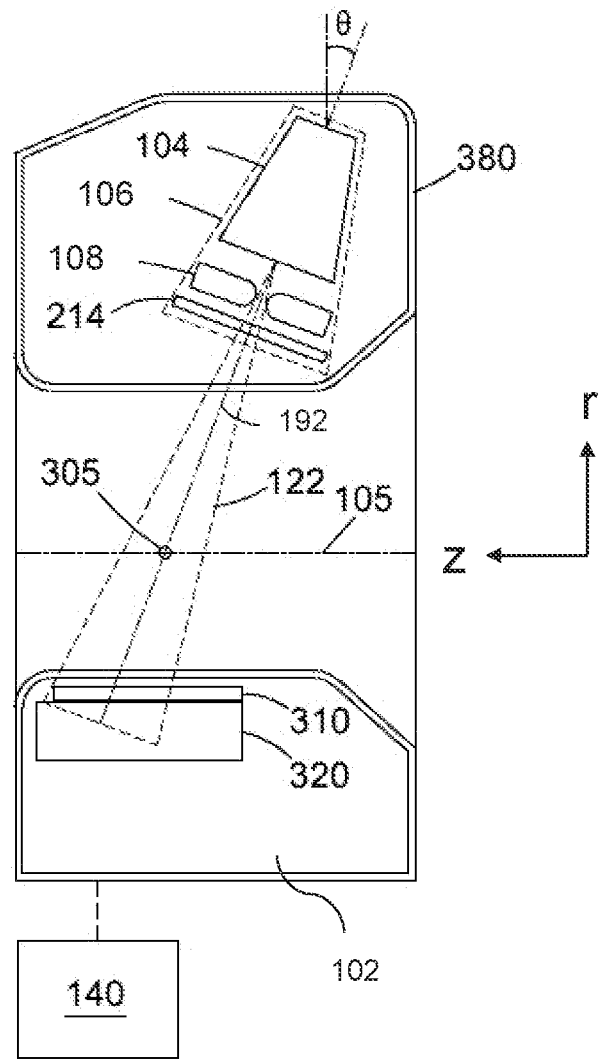

FIGS. 3A and 3B illustrate simplified sections through a radiotherapy device according to the present disclosure. FIG. 3A illustrates the radiotherapy device in a coplanar configuration, while FIG. 3B illustrates the radiotherapy apparatus in a non-coplanar (or 'tilted') configuration. The tilt is accomplished by means of the tilting mechanism described with reference to FIGS. 4a and 4b below.

As shown in FIGS. 3A and 3B, a source of radiation 106 is configured to emit a radiation beam 122. In the coplanar configuration, the beam is emitted along a first beam axis 191 (or 'radiation axis' or 'beam path'). In the non-coplanar configuration, the beam is emitted along a second beam axis 191. The radiation beam 122 is incident on a beam receiving apparatus which includes a beam stopper 320 and a radiation detector 310. The radiation detector 310 may comprise, for example, an electronic portal imaging device (EPID). The source of radiation 106 may additionally comprise one or more of a waveguide 104; and a beam shaping apparatus comprising one or both of a multi-leaf collimator (MLC) 108, and a diaphragm 214. As depicted in the figures, these components are all tilted when the source of radiation is moved to the non-coplanar configuration. In both configurations, the beam axis 191, 192 intersects the gantry axis of rotation 105 at or near the isocentre 305. In other words, the beam passes through the isocentre 305 in both coplanar and non-coplanar configurations.

The source of radiation 106 comprising the waveguide 104 and the beam shaping apparatus 108, 214 may be disposed within a housing 380. The housing provides protection and also means that coplanar and non-coplanar treatment can be provided without movement of the source of radiation 106 being visible for user or patient, and without any risk of inadvertent contact between the subject and the source of radiation 106 (or the beam receiving apparatus).

A controller 140 controls movement of the source of radiation 106 between the coplanar and tilted configurations by controlling a tilting apparatus. The controller 140 also controls rotation of the gantry, and also controls the beam shaping apparatus to limit the field of the beam.

The gantry 102 is rotatable around an axis of rotation 105. The gantry 102 supports the source of radiation 106, the beam receiving apparatus, and the tilting mechanism (not shown) such that they are rotatable with the gantry. In the coplanar configuration the source of radiation 106 is orientated such that the beam axis 191 is perpendicular to the axis of rotation 105. At this position the radiation source 106 may be considered to be tilted at 0 degrees. In the non-coplanar configuration, the source of radiation 106 is orientated such that the radiation source 106 is at a different (e.g. non-zero) angle θ. As shown in FIG. 33, the angle θ is the angle of the radiation source 106 in non-coplanar configuration compared to the angle of the radiation source 106 in a coplanar configuration.

The directions z and r are marked on FIGS. 3a and 3b. The direction z is parallel with the gantry rotation axis 105. The direction r is a radial direction, which is perpendicular to the gantry axis of rotation 105. It will therefore be appreciated that the tilt angle, θ, defines the degree of tilt in the non-coplanar configuration with respect to the radial direction.

Figure 4A:
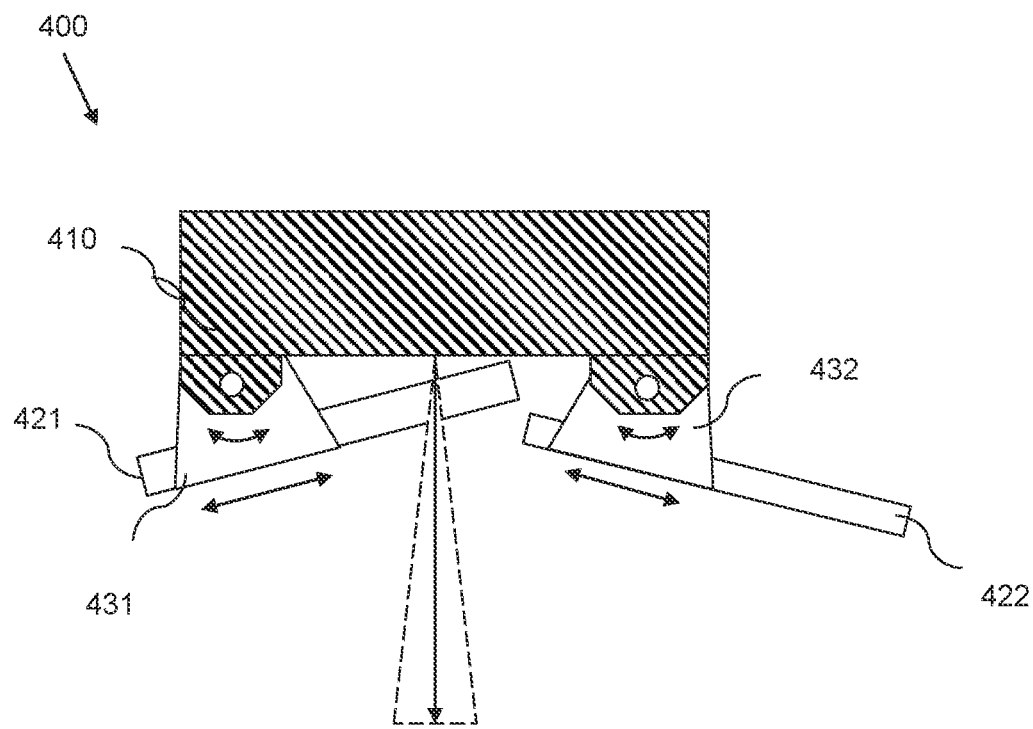
FIGS. 4a, 4b and 4c depict a tilting mechanism according to the present disclosure, with FIG. 4a depicting the apparatus in a coplanar configuration and FIG. 4b depicting the apparatus in a non-coplanar configuration.
Figure 4B:
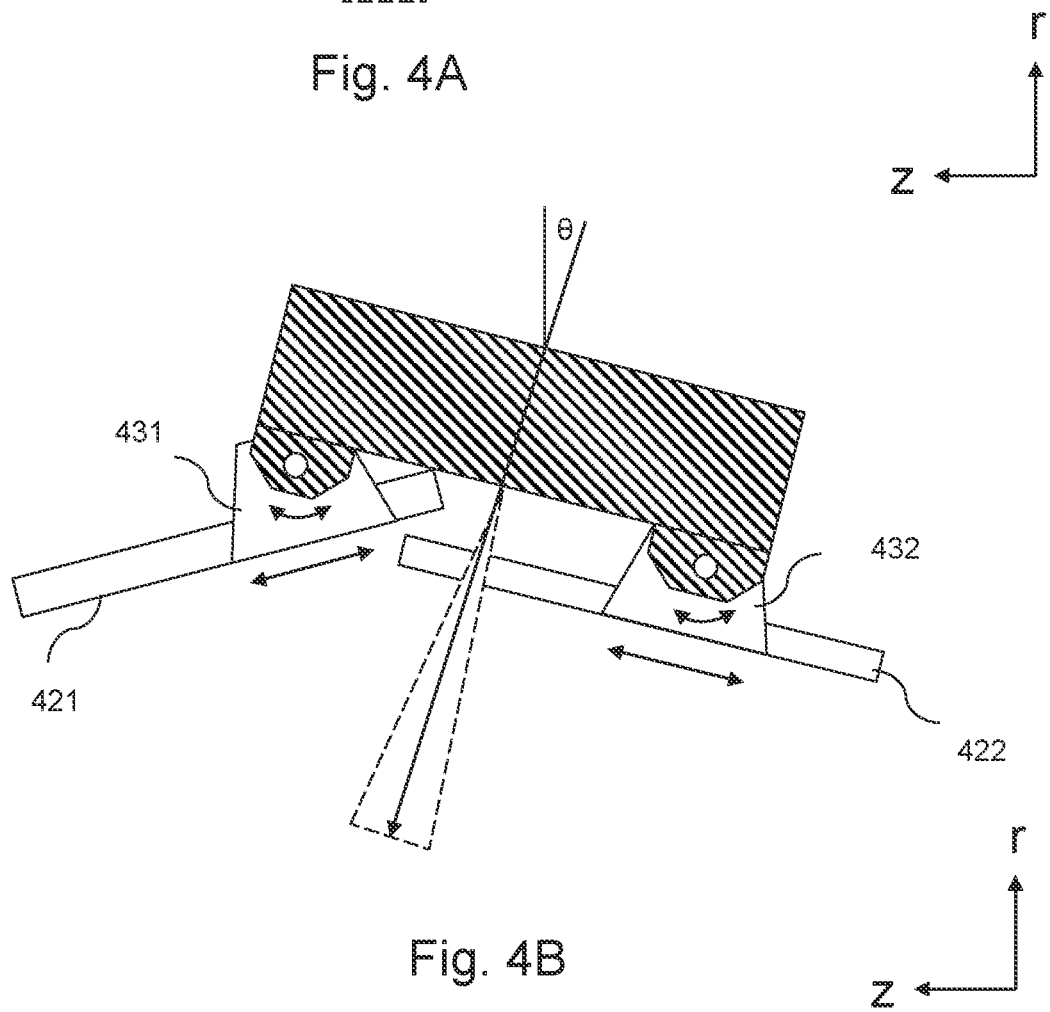
Figure 4C:
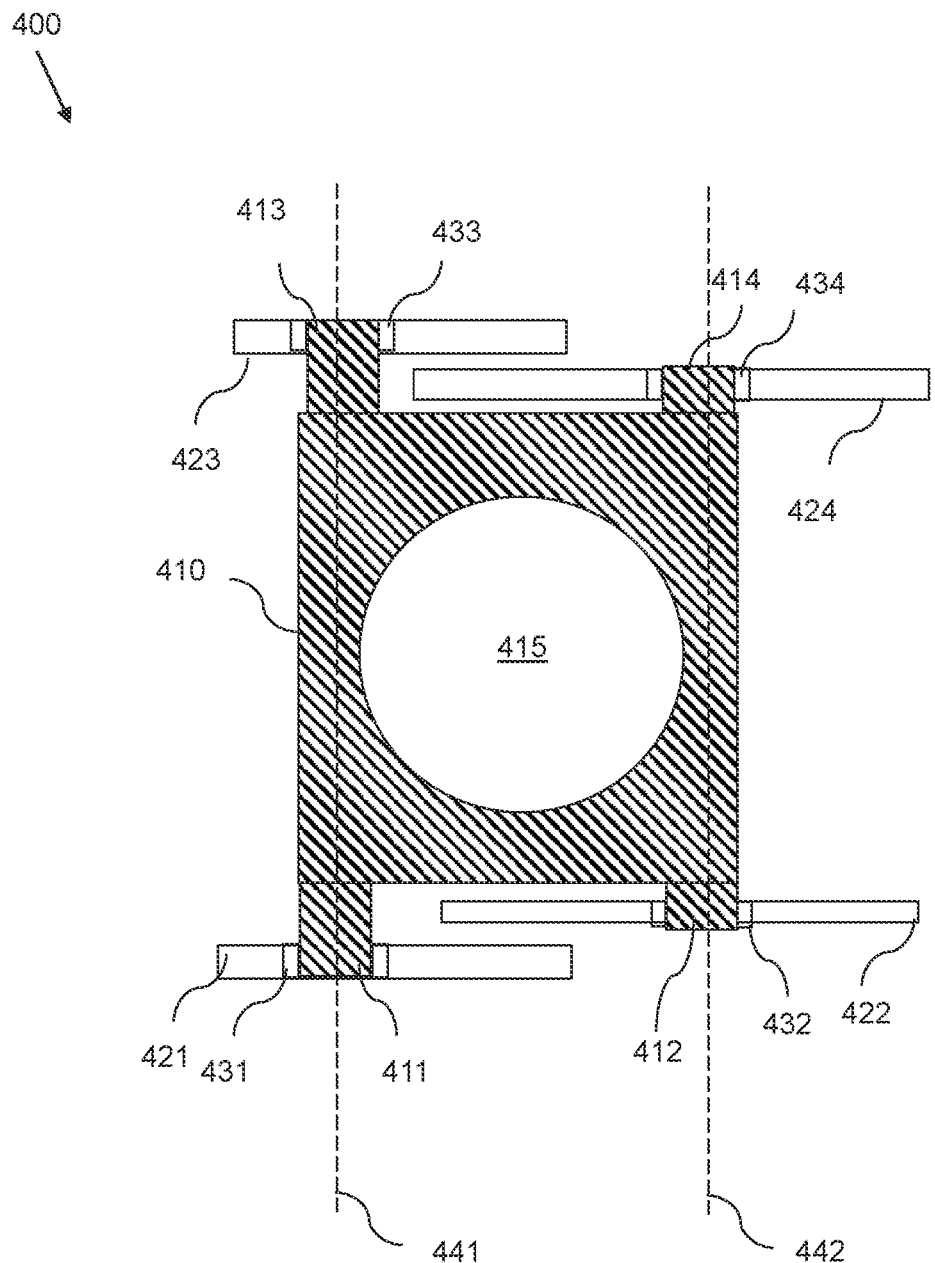

The controller 140 controls the configuration of the source of radiation 104 via controlling the tilting mechanism described below, and in particular by controlling the drive means of the tilting mechanism. The controller 140 additionally controls the MLC 108, FIGS. 4A, 4B, and 4C show a tilting apparatus 400 for tilting a source of radiation, in accordance with the present disclosure. These figures are simplified schematics to aid understanding. The source of radiation itself is not shown in the figures. The tilting apparatus 400 may be comprised within the radiotherapy devices described above with respect to FIGS. 1 and 3a, 3b.

FIG. 4A depicts the apparatus 400 in a coplanar configuration. When the tilting apparatus 400 is in this configuration, the source of radiation would be positioned to emit a beam of therapeutic radiation along a first axis with respect to the gantry. The first axis is substantially parallel to a radial axis, which is substantially perpendicular to the gantry rotation axis. A radiotherapy device comprising a tilting mechanism in this coplanar configuration in this manner is depicted in FIG. 3a.

FIG. 4A depicts the apparatus 400 in a non-coplanar, i.e. tilted, configuration. When the tilting apparatus 400 is in this configuration, the source of radiation would be positioned to emit a beam of therapeutic radiation along a second, angled beam axis. The second beam axis is angled with respect to both a radial axis and the gantry rotation axis. This second beam axis meets the radial axis at an angle θ, as depicted in FIGS. 3h, and 4b. The second beam axis meets the gantry rotation axis at an acute angle of 90-θ'. A radiotherapy device comprising a tilting mechanism in the non-coplanar configuration in this manner is depicted in FIG. 3h. As should be appreciated from FIGS. 3a and 3b, the first and second beam axes meet at a common isocentre 305.

FIG. 4C is a plan view of the tilting apparatus 400 when it is positioned in the coplanar configuration, which depicts a first and second rotational axis of the tilting mechanism 400.

The tilting apparatus 400 comprises a plurality of guide rails and a plurality of carriages. The carriages are configured to be translated along the guide rails. The plurality of guide rails comprises at least a first guide rail 421 and a second guide rail 422. The apparatus 400 also comprises a first carriage 431 and a second carriage 432. The first carriage 431 is coupled to the first guide rail 421 such as to be translatable along the first guide rail 421. Similarly, the second carriage 432 is coupled with the second guide rail 422 such as to be translatable along the second guide rail 422.

As can best be appreciated from FIG. 4c, the plurality of guide rails further comprises a third guide rail 423 and a fourth guide rail 424, and the plurality of carriages further comprises a third carriage 433 and a fourth carriage 434, The third carriage 433 is translatable along the third guide rail 423 and the fourth carriage 434 translatable along the fourth guide rail 424. Each guide rail of the plurality of guide rails is linear, and the motion of the carriages along the guide rails is linear. Each of the carriages can be linearly translated along its respective guide rail. This linear movement is depicted by double-headed, straight arrows in FIGS. 4a and 4b.

In an example, each of the plurality of guide rails is a linear guide rail, taking the form of an elongated beam comprising at least one guiding groove or recess. Each guide rail comprises a carriage moveable along the guide rail. The carriage comprises a linear bearing/linear bearings which enable contact between the guide rail and the carriage, and enable the movement of the carriage along the guide rail.

The apparatus 400 further comprises drive means such as one or more actuators (not shown) configured to translate the plurality of carriages along the guide rails. The one or more actuators are preferably linear actuators, and may take the form of a motor-driven ball screw, lead screw, or another mechanism capable of driving the linear motion of the carriages along the guide rails. The drive means is configured to adjust the degree of tilt of the tilting mechanism 400. In an example, the apparatus 400 may comprise a single actuator coupled to one of the carriages, for example the first carriage 431. Alternatively, the device 400 may comprise more than one actuator, for example a first actuator coupled to the first carriage 431 and a second actuator coupled to the third carriage 433. In this example, the first and second actuators may be actuated synchronously in order to adjust the position of the first and third carriages 431, 433 along the first and third guide rail 421, 423.

The apparatus 400 further comprises a support structure 410 for supporting a source of radiation. In use, the source of radiation is fixedly coupled to the support structure such that the source of radiation is tiltable along with the support structure 410. A stable, rigid coupling between the support structure 410 and the source of radiation can be achieved in many ways, for example via screws or any other suitable means which would be known to the skilled person. The support structure 410 comprises an aperture 415 through which, in use; a beam of therapeutic radiation may pass. As described above with respect to FIGS. 3a and 3b, the support structure may support a number of additional components, for example a beam shaping apparatus comprising an MLC 108 and/or and a diaphragm 214. When taken together, the components supported by the support structure 410 may be described as a 'radiation head'.

The support structure 410 is rotatably coupled to the carriages of the plurality of carriages. The first carriage 431 and the second carriage 432 are positioned on a first side of the support structure 410; and the third carriage 433 and fourth carriage 434 are positioned on a second, opposite side of the support structure 410. The first carriage 431 and the second carriage 432 are rotatably coupled to the first side of the support structure 410, and the third carriage 433 and fourth carriage 434 are rotatably coupled to the second, opposite side of the support structure 410. The rotary coupling of each carriage with the support structure 410 is such that relative rotation between the support structure 410 and the carriages is enabled about one of a plurality of parallel rotational axes, and in particular a first rotational axis 441 and a second rotational axis 442. The first carriage 431 and third carriage 433 define the first rotational axis 441 of the support structure 410, and the second carriage 432 and fourth carriage 434 define the second rotational axis 442 of the support structure 432. These rotational axes are depicted using double-headed curved arrows in FIGS. 4a and 4b, and in dashed lines in FIG. 4c. The first and second carriages 431, 432 are separated from one another on the first side of the support structure 410 in a direction parallel to the gantry rotation axis 105. The third and fourth carriages 433, 434 are separated from one another on the second side of the support structure in a direction parallel to the gantry rotation axis 105 to the same degree. Accordingly, the first and second rotational axes 441, 442 are separated from one another in a direction parallel to the gantry rotation axis.

The rotational coupling can be accomplished in any of several ways. For example, as depicted in the figures, the support structure may comprise coupling elements 411, 412, 413, 414 which are each rotationally coupled to a carriage. The rotatable coupling may be achieved with a suitable combination of bearings and axles as would be understood by the skilled person. In an example, each carriage may comprise a rotary bearing, and each coupling element may comprise an axle or shaft configured for rotation within the bearing, or vice versa. Accordingly; each carriage may comprise both a linear bearing to facilitate movement of the carriage in a linear direction along a guide rail, and also a rotary bearing to enable relative rotation between the carriage and the support structure 410.

The tilting apparatus 400 may be coupled to, or form part of, a radiotherapy device such as the radiotherapy device depicted in FIGS. 3A, 3B. In particular, the guide rails 421, 422, 423, 424 may be fixedly coupled to the gantry of the radiotherapy device, or else may be integrally formed from material comprising part of the gantry, such that the guide rails are rotatable with the gantry.

The first guide rail 421 and second guide rail 422 are angled with respect to one another, such that translation of the first carriage 431 along the first guide rail 421 and translation of the second carriage 432 along the second guide rail 422 causes tilting of the support structure 410. The first guide rail 421 and the second guide rail 422 are oblique with respect to one another. When coupled to a radiotherapy device, the first guide rail 421 and the second guide rail 422 are fixed to the gantry so as to be oblique with respect to the gantry rotation axis 105. In addition, the first guide rail 421 and the second guide rail 422 are fixed to the gantry so as to be oblique with respect to a radial axis defined by the gantry rotation axis 105. The first guide rail 421 and the second guide rail 422 are not parallel or perpendicular with respect to another, and are also not parallel or perpendicular with respect to the gantry rotation axis 105 and a radial axis defined by the gantry rotation axis 105.

The first guide rail 421 and the third guide rail 423 are positioned at opposite sides of the support structure 410, and are parallel with one another. Similarly, the second guide rail 422 and the fourth guide rail 424 are positioned at opposite sides of the support structure 410, and are parallel with one another. As described above, the rotational coupling between the first carriage 431 and the support structure 410 shares a common axis, the first rotational axis 431, with the rotational coupling between the third carriage 433 and the support structure 410. Similarly, the rotational coupling between the second carriage 432 shares a common axis, the second rotational axis 432, with the rotational coupling between the fourth carriage 434 and the support structure 410. The support structure 410 therefore has two rotational axes, and both rotational axes are perpendicular to the gantry rotation axis 105 and the radial axis defined by the gantry rotational axis 105.

Throughout translation of the carriages along the guide rails and the resultant tilting of the support structure 410 and source of radiation, the point at which the first carriage 431 is rotationally coupled to the support structure 410 is kept at the same radial distance from the gantry rotation axis 105 as the point at which the third carriage 433 is rotationally coupled to the support structure 410.

Similarly, the point at which the second carriage 432 is rotationally coupled to the support structure 410 is kept at the same radial distance from the gantry rotation axis 105 as the point at which the fourth carriage 434 is rotationally coupled to the support structure 410.

Each of the plurality of guide rails is angled to slope away from the tilting apparatus 400, and equivalently from the source of radiation, in a direction parallel to the gantry rotation axis 105. Ln other words, each of the plurality of guide rails is sloped toward the gantry rotation axis 105 when moving along the slope in a direction away from the tilting apparatus 400; equivalently, each of the plurality of guide rails is sloped toward the gantry rotation axis 105 in a direction moving away from the source of radiation. The first and second guide rail are sloped in different directions, such that the first guide rail slopes toward the gantry rotation axis in, or along, a first slope direction moving away from the first beam axis; and the second guide rail slopes toward the gantry rotation axis in, or along, a second slope direction moving away from the first beam axis.

Because the first and third guide rails 421, 423 are angled with respect to the second and fourth guide rails 422, 424, translation of the carriages along the guide rails adjusts the relative distance between the first and second rotational axes of the support structure 410.

Because the guide rails are angled with respect to one another in the manner described above, linear translation of the carriages 431, 432, 433, 434 along their respective guide rails 421, 422, 423, 424 adjusts a relative distance between a) the first and third carriages 431, 433, and b) the second and fourth carriages 432, 434. In particular, the radial distance between the first rotation axis of the support structure 410 (defined by the first and third carriages 431, 433) and the second rotation axis of the support structure 410 (defined by the second and fourth carriages 432, 434) is adjusted as the carriages move along their guide rails. This causes the support structure 410 to tilt as the carriages translate along the guide rails.

In use, a radiotherapy device and tilting mechanism may first be positioned in the coplanar configuration depicted in FIGS. 3a and 4a. In this configuration, as the gantry is rotated, the source of radiation may emit radiation along a first beam axis in the radial plane. In other words, in this configuration, the first beam axis meets the gantry rotation axis at substantially 90° throughout rotation of the gantry. The source of radiation, if it were to emit radiation toward the isocentre 305 throughout a full gantry rotation, would sweep out a circle. In this configuration of the tilting apparatus 400, coplanar treatment can be delivered.

In order to tilt the source of radiation and deliver radiation in a co-planar manner, the drive means translates the carriages along the guide rails. The tilting will be described with reference to the implementation depicted in FIGS. 4a and 4b as an example, and with reference to an example implementation in which the drive means comprises two linear actuators, one coupled to the first carriage 431 and the second coupled to the third carriage 433. However, given the present disclosure, the skilled person would appreciate that several other implementations are possible. To tilt the tilting mechanism 400 from the coplanar configuration of FIG. 4a into the tilted configuration of FIG. 4b, both linear actuators are driven in order to translate the first and third carriages 431, 433 in an 'upward' direction along the first and third guide rails 421, 423 respectively. This movement is transferred to the second and fourth carriages 432, 434, which in turn move in a direction 'downward' along their respective guide rails 422, 424.

While reference is made to 'upward' and 'downward' movement to aid understanding with reference to the figures, it should be understood that the tilting movement can be effected while the gantry has been rotated to any degree. Therefore, it is more correct to say that, in order to move the tilting mechanism from the coplanar configuration depicted in FIG. 4a to the tilted configuration in FIG. 4b, both linear actuators are driven in order to translate the first and third carriages 431, 433 along the angled linear guide rails 421, 422 in direction away from the gantry rotation axis 105. This causes the first rotation axis of the support structure 410 to move further away from the gantry rotation axis 105. This movement is transferred to the second and fourth carriages 432, 434, which in turn move closer toward the gantry rotation axis 105. This causes the second rotation axis of the support structure 410 to move closer toward the gantry rotation axis 105.

As the carriages are linearly translated along the guide rails in this way, the support structure 410 rotates about its rotational axes 441, 442. The support structure 410, and therefore the source of radiation, are thereby tilted as the carriages are moved along the guide rails. In addition, the support structure 410, and therefore the source of radiation, are themselves translated in a direction generally parallel to the gantry rotation axis 105. The effect of translation of the carriages, therefore, is to adjust the position of the source of radiation in both the Z and r dimensions.

The degree of translation of the carriages controls the degree of tilt, θ, of the support structure 410. The drive means halts translation of the carriages when the tilting mechanism has reached the non-coplanar (tilted) configuration, i.e. when the support structure 410 has been tilted to the degree shown in FIG. 4b. In an example, the degree of translation/actuation required to move the tilting mechanism between the coplanar and the non-coplanar configuration is predetermined. Thereafter, it is possible to move between the coplanar and the con-planar configuration by adjusting the degree of translation of the carriages by the predetermined amount. This predetermined amount can be calibrated, for example until the source of radiation is able to direct radiation toward the isocentre 305 from both configurations. Alternatively, or additionally, one or more of the guide rails may comprise one or more stoppers which define the end points of translation along the guide rails which are associated with each configuration.

When the tilting mechanism 400 (and equivalently the source of radiation) has been tilted into the configuration depicted in FIG. 4b, radiation can be applied toward the patient from non-coplanar angles. In this configuration, as the gantry is rotated, the source of radiation may emit radiation along a second beam axis, which is angled with respect to both the radial direction and the gantry rotation axis 105. In this configuration, the second beam axis meets the gantry rotation axis at a non-parallel and non-perpendicular angle throughout rotation of the gantry. The source of radiation, if it were to emit radiation toward the isocentre 305 throughout a full gantry rotation, would sweep out a cone. In this configuration of the tilting apparatus 400, non-coplanar treatment can be delivered.

It will be appreciated that the drive means can be actuated in one of two directions in order to either tilt the source of radiation into the non-coplanar configuration or bring the source of radiation back into the coplanar configuration.

The tilting mechanism of the present disclosure, and a radiotherapy device comprising such a tilting mechanism, is advantageous for several reasons.

The radial and horizontal displacements are small between a) the tilting mechanism/source of radiation in the coplanar configuration, and b) the tilting mechanism/source of radiation in the non-coplanar configuration. Accordingly, the apparatus makes better use of available space. This is important given that hospitals have limited space available in radiotherapy bunkers. Making optimal use of space in a radial direction is particularly beneficial given that the tilting mechanism is to be rotated throughout 360' during treatment.

Also, because the radial and horizontal displacements between the coplanar and non-coplanar configurations are small, the displacement of the centre of mass of the source of radiation is kept small as the apparatus moves between the coplanar and non-coplanar configuration. Accordingly, there is less need of complex counter-balancing measures, and the overall radiotherapy device can be made more stable. The power required by the drive means to shift the source of radiation between the tilted and non-tiled configurations can also be kept low, meaning lower power and less expensive motors/actuators can be used. In addition, because the radial and horizontal displacements are small, the entire tilting mechanism can more easily be kept within a gantry cover. In this way, collision avoidance measures can be simplified, ingress of dust and dirt into the apparatus workings can be prevented, and the source of radiation and tilting mechanism can be kept hidden from the patient. In addition, because the radial and horizontal displacements between the coplanar and non-coplanar configurations are small, there is more radial room available for maximising the size of a 'bore' of the device, i.e. the cylindrical region in which the patient lies during treatment. It is thought that increasing the size of the bore reduces patient discomfort which may otherwise be associated with, for example, feelings of claustrophobia.

The present tilting mechanism has the further advantage of being operable to adjust the tilt angle while the gantry is rotating. The drive means can be used to move the apparatus between the coplanar and the non-coplanar configuration, for example, while the gantry is being rotated to the next angle of delivery. A radiotherapy device incorporating such a tilting mechanism can therefore be used to reduce treatment time and improve patient throughput.

The tilting mechanism of the present disclosure is simpler to engineer, more reliable, and less likely to break down than previous designs of combined coplanar and non-coplanar tilting mechanisms. Because the design makes use of linear translation, it is straightforward to engineer and to calibrate to achieve the desired degree of tile. The design can make use of a straightforward linear actuator, or a plurality of linear actuators, rather than more complicated actuation mechanisms. In addition, the tilting mechanism causes adjustment of the tilting mechanism in both a radial and a horizontal direction using a single, simple mechanism. It is also straightforward to adjust the tilt angle of the non-coplanar configuration in a design phase, by adjusting the relative angle between a) the first (and optionally the third) guide rail, and b) the second (and optionally the fourth) guide rail.

The presently disclosed tilting mechanism comprises a first and a second guide rail, coupled with a respective first and second carriage. It is noted that the tilting mechanism has been described primarily with respect to a particular implementation comprising four guide rails and four carriages. While such a design has the benefit of improved stability, the skilled person will appreciate that a design with just two guide rails is possible, particularly with high-quality and rigid components. Accordingly, it is to be understood that while a design with four guide rails and four carriages is particularly beneficial, this number of guide rails/carriages is far from essential.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled,

What is claimed is:

1. A radiotherapy device comprising:
   a tilting apparatus for tilting a source of radiation, the tilting apparatus comprising:
   a plurality of guide rails comprising a first guide rail and a second guide rail;
   a plurality of carriages comprising a first carriage and a second carriage, the first carriage being translatable along the first guide rail and the second carriage being translatable along the second guide rail; and
   a support structure for supporting the source of radiation, wherein the support structure is rotatably coupled to each of the first carriage and the second carriage, and wherein the first guide rail and the second guide rail are obliquely angled with respect to one another such that translation of the first carriage and the second carriage along the first guide rail and the second guide rail causes tilting of the support structure.

2. The radiotherapy device of claim 1, further comprising:
   a gantry configured to rotate the tilting apparatus about a gantry rotation axis.

3. The radiotherapy device of claim 2, wherein the plurality of guide rails are fixedly coupled to the gantry to rotate therewith.

4. The radiotherapy device of claim 2, wherein the support structure is tiltable between a first configuration and a second configuration, wherein, in the first configuration, the source of radiation is positioned to emit radiation along a first beam axis, and in the second configuration the source of radiation is positioned to emit radiation along a second beam axis.

5. The radiotherapy device of claim 4, wherein the first beam axis and the second beam axis meet at a common isocentre.

6. The radiotherapy device of claim 4, wherein the first beam axis is orthogonal to the gantry rotation axis, and wherein the second beam axis meets the gantry rotation axis at an acute angle.

7. The radiotherapy device of claim 4, wherein the first guide rail slopes toward the gantry rotation axis in a first slope direction moving away from the first beam axis, and wherein the second guide rail slopes toward the gantry rotation axis in a second slope direction moving away from the first beam axis.

8. The radiotherapy device of claim 2, wherein the first carriage is rotationally coupled to the support structure to define a first rotational axis and the second carriage is rotationally coupled to the support structure to define a second rotational axis, wherein translation of the first carriage and the second carriage along the first guide rail and the second guide rail changes a relative distance, in a radial direction, between the first rotational axis and the second rotational axis, and wherein the radial direction is perpendicular to the gantry rotation axis.

9. The radiotherapy device of claim 1, further comprising: the source of radiation coupled to the support structure.

10. The radiotherapy device of claim 1, wherein the plurality of guide rails are linear.

11. The radiotherapy device of claim 1, further comprising:
an actuator configured to translate the plurality of carriages along the plurality of guide rails.

12. The radiotherapy device of claim 11, wherein the actuator is a linear actuator coupled to at least one of the first carriage or the second carriage.

13. The radiotherapy device of claim 1, wherein the plurality of guide rails further comprise a third guide rail and a fourth guide rail, wherein the plurality of carriages further comprise a third carriage and a fourth carriage, wherein the third carriage is translatable along the third guide rail and the fourth carriage is translatable along the fourth guide rail, wherein the support structure is further rotatably coupled to each of the third carriage and fourth carriage, wherein the first guide rail and the third guide rail are substantially parallel with respect to one another, and wherein the second guide rail and fourth guide rail are substantially parallel with respect to one another.

14. The radiotherapy device of claim 13, wherein the first guide rail and the second guide rail are positioned on a first side of the support structure, and wherein the third guide rail and the fourth guide rail are positioned on a second, opposite side of the support structure.

15. A tilting apparatus for tilting a source of radiation in a radiotherapy device, the tilting apparatus comprising:
a plurality of guide rails comprising a first guide rail and a second guide rail;
a plurality of carriages comprising a first carriage and a second carriage, the first carriage being translatable along the first guide rail and the second carriage being translatable along the second guide rail; and
a support structure for supporting the source of radiation, wherein the support structure is rotatably coupled to each of the first carriage and the second carriage, and wherein the first guide rail and the second guide rail are obliquely angled with respect to one another such that translation of the first carriage and the second carriage along the first guide rail and the second guide rail causes tilting of the support structure.

16. A method of tilting a source of radiation of a radiotherapy device, the radiotherapy device comprising a source of radiation and a drive member comprising one or more linear actuators configured to translate a plurality of carriages along a plurality of guide rails respectively to cause tilting of a support structure, wherein at least two of the plurality of guide rails are oblique with respect to one another, the method comprising:
while the radiotherapy device is in a coplanar configuration, driving the one or more linear actuators to translate the carriages along the guide rails in a first direction to tilt the source of radiation into a non-coplanar configuration, and
while the radiotherapy device is in the non-coplanar configuration, driving the linear actuators to translate the carriages along the guide rails in a second, opposite direction to thereby bring the source of radiation back to the coplanar configuration.

* * * * *